April 23, 1946. R. T. WHITNEY 2,398,902
BRAKE CYLINDER VENTING APPARATUS
Filed Sept. 22, 1944
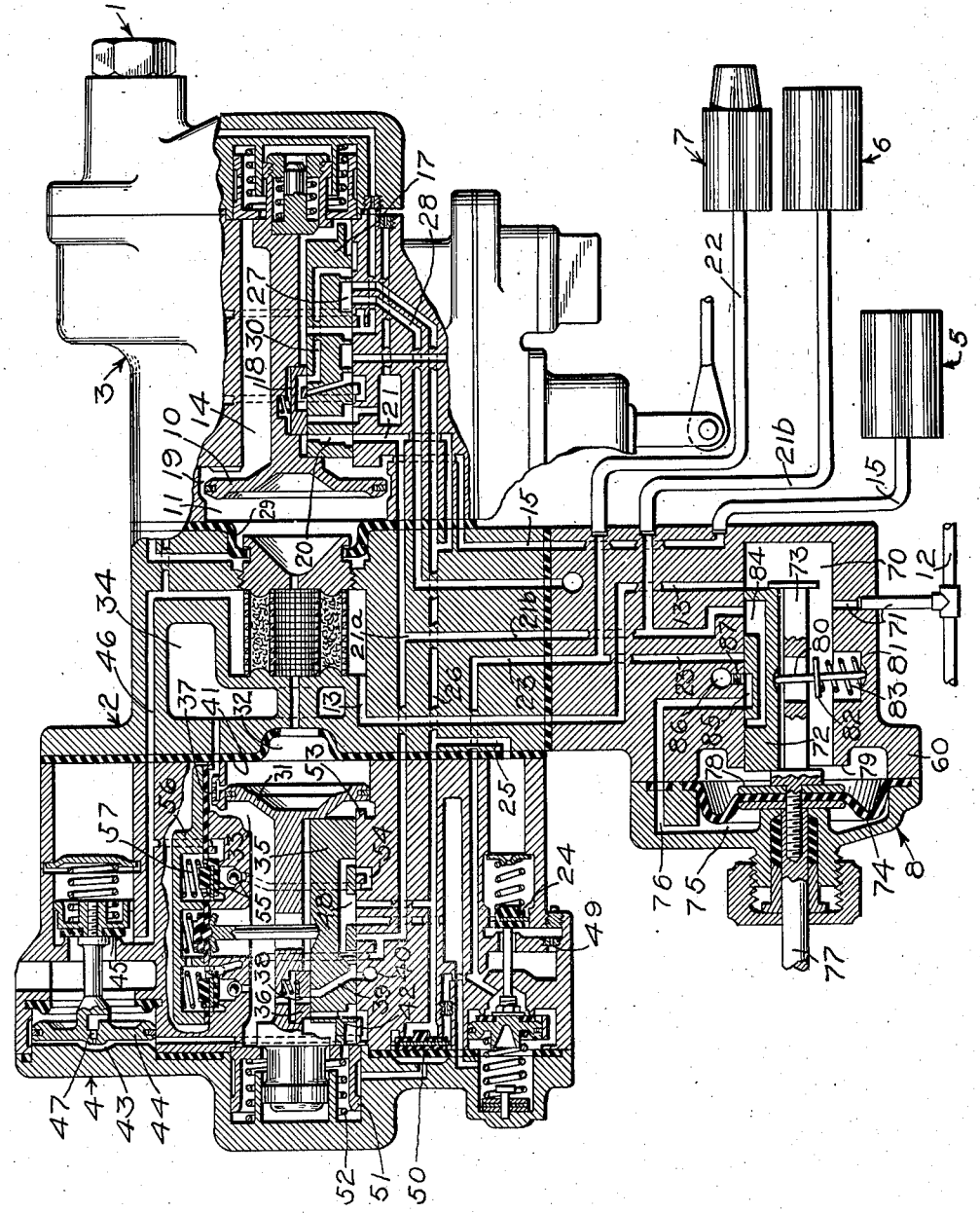
INVENTOR
RALPH T. WHITNEY
BY
ATTORNEY Patented Apr. 23, 1946

2,398,902

UNITED STATES PATENT OFFICE 2,398,902

BRAKE CYLINDER VENTING APPARATUS

Ralph T. Whitney, Irwin, Pa., assignor to The Westinghouse Air Brake Company, Wilmerding, Pa., a corporation of Pennsylvania Application September 22, 1944, Serial No. 555,255

9 Claims. (Cl. 303—68)

This invention relates to fluid pressure brake apparatus of the automatic type and more particularly to means for causing operation of said apparatus to effect a release of the brakes.

When a car equipped with automatic brake apparatus and having the reservoir or reservoirs thereof charged with fluid under pressure is cut out of a train, the brake pipe of a car is vented and as a consequence of the resulting reduction in brake pipe pressure the brake controlling valve device will move to emergency position. Movement of the brake controlling valve device to emergency position establishes communication between the reservoir or reservoirs and the brake cylinder device to permit the fluid in said reservoir or reservoirs to equalize into the brake cylinder device to effect an emergency application of the brakes on the car.

When releasing a brake application thus effected, the usual practice has been for a trainman to operate the reservoir release valve or valves to completely dissipate the fluid under pressure from the reservoir or reservoirs and thereby from the connected brake cylinder device to release the brakes. This operation not only wastes the stored fluid pressure in the reservoir or reservoirs but also requires time on the part of the trainman since he must hold the reservoir release valve or valves open until the brakes are released. When a car is subsequently placed in a train, it is then necessary to completely recharge the reservoir or reservoirs either by a local yard charging plant or by a coupled locomotive before the train may be moved. This requires a relatively long period of time and consequently excessive use and wear of apparatus to accomplish the foregoing, all of which is undesirable.

From the foregoing it will be understood that it is desirable to release the brakes without dissipating the stored fluid pressure in the reservoir or reservoirs when the car is cut out of a train, and one object of the invention is the provision of novel brake release means for accomplishing this result.

According to the invention this object is attained by brake release means, which, though not limited in use to any specific triple valve or the like, is particularly arranged for attachment to the pipe bracket of the well known "AB" brake controlling valve device. This brake release means embodies a slide valve having a normal position opening communication between the brake pipe of the car and the brake pipe passage in the "AB" valve device and a release position for closing said communication and for connecting the emergency reservoir on the car to the brake pipe passage and also connecting the brake cylinder device to atmosphere. The brake release means provides in its release position, for equalization of the emergency reservoir into the brake pipe passage and thereby into the service and emergency piston chambers of the "AB" valve device. Upon a slight increase in the pressure of fluid in the emergency piston chamber the emergency piston will cause the slide valve means associated therewith to disconnect the emergency reservoir from the auxiliary reservoir and the brake cylinder device. Since the brake cylinder device is open to atmosphere by way of a passage in the brake release means, the fluid pressure in the auxiliary reservoir and the brake cylinder device will thus be reduced until at approximately 55 pounds the service piston will cause its slide valve to move to the left and disconnect the auxiliary reservoir from the brake cylinder device. The fluid under pressure remaining in the brake cylinder device only will continue to vent to atmosphere. At the same time, the emergency reservoir is connected to a chamber containing a diaphragm which is responsive to the pressure of fluid in said chamber to maintain the slide valve in its release position until the brake pipe is recharged, as after the car is again cut into a train. At that time the pressure of fluid supplied to the brake pipe will automatically reset or actuate the slide valve of the release means back to its normal position to reconnect the "AB" valve to the brake pipe, so that said valve may then be controlled from the brake pipe, in the usual manner.

Other objects and advantages will be apparent from the following more detailed description of the invention.

In the accompanying drawing the single figure is a diagrammatic view, mainly in section, of an "AB" brake equipment having associated therewith brake release means embodying the invention.

*Description—"AB" brake equipment*

As shown in the drawing, the brake equipment comprises an "AB" brake controlling valve device 1 embodying a pipe bracket 2, a service portion 3 mounted on one face of said bracket, and emergency portion 4 mounted on another face of said bracket, and other parts which, while shown in elevation, do not enter into the invention and will not therefore be described. The brake equipment further comprises the usual auxiliary reservoir 5, emergency reservoir 6, brake cylinder device 7 and, according to the invention, the brake releasing valve device 8 arranged for attachment to the pipe bracket 2.

The service portion 3 comprises a piston 10 having at one side a piston chamber 11 which is normally in communication with a brake pipe 12 by way of a passage 13 and then through the brake releasing valve device 8, as will be hereinafter described. At the opposite side of piston 10 is a valve chamber 14 which is in constant open communication with the auxiliary reservoir 5 by way of a passage and pipe 15, a portion of said passage being formed in the casing of the brake releasing valve device 8. The valve chamber 14 which contains a slide valve 17 and an auxiliary slide valve 18 is arranged for control by the piston 10 in the usual manner.

When the brake pipe 12 and piston chamber 11 are being charged with fluid under pressure and piston 10 is in its brake release position as shown, fluid will flow from said piston chamber through a feed groove 19 around said piston to valve chamber 14 and thence through passage and pipe 15 to the auxiliary reservoir 5 to charge the same to the same pressure as that in the brake pipe. With piston 10 and slide valves 17 and 18 of the service portion 3 in release position, fluid under pressure flows from valve chamber 14 through a port 20 in the main slide valve 17 to a passage 21, and thence to a connecting passage 21a. Fluid under pressure thus supplied to passage 21a flows to the emergency reservoir 6 by way of a connected passage and pipe 21b for charging said reservoir to brake pipe pressure. Also, in the release position of the main slide valve 17 the brake cylinder is open to the atmosphere through a pipe 22, passage 23, past check valve 24 in the emergency portion 4 of the control valve device 1, and thence through passages 25 and 26, a cavity 27 in said slide valve and a release passage 28.

Upon a reduction in pressure in brake pipe 12 and thus in piston chamber 11 at either a service or an emergency rate, the piston 10 is adapted to move into sealing engagement with a gasket 29 which is clamped between the pipe bracket 2 and the casing of the service portion 3. During such movement the piston first shifts the auxiliary slide valve 18 relative to the main slide valve 17 to a position lapping port 20 and opening a service port 30 to the valve chamber 14, and then shifts both slide valves in unison to a position in which the brake cylinder passage 26 is disconnected from the release passage 28 and connected with the service port 30. Fluid under pressure then flows from valve chamber 14 and thereby from the auxiliary reservoir 5 to the brake cylinder device 7 and actuates the same to apply the brakes on the vehicle.

Upon a subsequent increase in brake pipe pressure for effecting a release of the brakes, the piston 10 and slide valves 17 and 18 are returned to their normal positions in which they are shown and in which the auxiliary reservoir 5 is supplied with fluid from the brake pipe by way of feed groove 19 and from the emergency reservoir 6 by way of port 20 until substantial equalization of the pressures in both auxiliary and emergency reservoirs occurs, when both reservoirs charge to the normal pressure in the brake pipe as before described.

Also, in this position of the main slide valve 17 the brake cylinder device 7 is disconnected from the auxiliary reservoir 5 and open to the atmosphere by way of passage 28 for releasing the brakes.

The emergency valve portion 4 comprises an emergency piston 31 having at one side a chamber 32 which is normally open to the brake pipe by way of passage 13 and the brake release valve device 8, and having at the opposite side a valve chamber 33 open to a quick action chamber 34. The valve chamber 33 contains a main slide valve 35 and an auxiliary slide valve 36 mounted on the main slide valve, the two slide valves being connected for movement by piston 31 in the usual manner.

When the brake pipe 12 and thereby the emergency piston chamber 32 are charged with fluid under pressure, the emergency piston 31 and slide valves 35 and 36 will occupy their normal position, in which they are shown. With the slide valve in this position, a feed port 37 is open to piston chamber 32 for supplying fluid under pressure from the brake pipe to valve chamber 33 and quick action chamber 34 to charge same with fluid at the same pressure as in the brake pipe.

Upon a service reduction in the pressure of fluid in piston chamber 32 in response to a service reduction in brake pipe pressure, the emergency piston and thereby the auxiliary slide valve 36 will move in the direction of said chamber to a position in which a port 38 in the auxiliary slide valve registers with a port 39 in the main slide valve and through these registering ports fluid will then flow from the valve chamber 33 and quick action chamber 34 through a passage 40 to atmosphere. This release of fluid under pressure from the valve chamber 33 and quick action chamber 34 will reduce the pressure in said chambers at the same rate as the brake pipe pressure acting on the opposite side of the piston 31 reduces upon a service rate of reduction in brake pipe pressure, so as to thereby stop movement of a piston 31 in the service position.

The venting capacity of ports 38 and 39 however is insufficient to reduce the pressure of fluid in valve chamber 33 as fast as the brake pipe pressure in piston chamber 32 reduces upon an emergency rate of reduction in brake pipe pressure so that upon such a reduction, a differential is produced between the pressure in piston chamber 32 and valve chamber 33 of such a degree as to cause this piston to move into an emergency position and engagement with a gasket 41, which is clamped between the pipe bracket 2 and the casing of the emergency portion 4. The emergency piston as it is thus moved will shift the main slide valve 35 to an emergency position in which a port 42 is open to valve chamber 33. Fluid under pressure will then flow from valve chamber 33 and quick action chamber 34 to port 42 and thence to a chamber 43 for actuating a piston 44 to unseat a brake pipe vent valve 45 past which a sudden quick venting of fluid under pressure from the brake pipe 12 then occurs by way of a passage 46. The fluid pressure in valve chamber 33 and quick action chamber 34 will then be gradually dissipated through a choked port 47 in piston 44 to permit closure of the vent valve 45 after a certain lapse of time.

In emergency position of the main slide valve 33 a cavity 48 therein connects the emergency reservoir passage 21a to passage 26 which upon an emergency reduction in brake pipe pressure is supplied with fluid under pressure from the auxiliary reservoir 5 by operation of the service portion 3 of the brake controlling valve device as hereinafter described. Fluid under pressure from both the auxiliary and emergency reservoirs will thus be supplied to passage 26 upon an emergency reduction in brake pipe pressure and such fluid will initially flow past check valve 24 to the brake cylinder device 7. The check valve 24 is arranged to close upon a certain increase in brake cylinder pressure following which further flow of fluid to the brake cylinder device will occur through a choke 49 and finally by way of a timing check valve 50 which also opens as is well known. An emergency application of the brakes is thus effected.

This specific control of the flow of fluid from the two reservoirs to the brake cylinder device is immaterial to the present invention and a further description thereof does not seem essential, since it is merely desired to bring out that upon an emergency reduction in brake pipe pressure, the auxiliary reservoir 5 is placed in communication with the brake cylinder device 7 by operation of the service portion 3, and the emergency reservoir 6 is placed in communication with the brake cylinder device by operation of the emergency valve device 4, and the fluid pressure in both of said reservoirs is therefore permitted to equalize into the brake cylinder device to effect the emergency application of the brakes.

It is also desired to bring out that when an emergency application of the brakes has been completed, the brake pipe 12, emergency valve chamber 33, and quick action chamber 34 will be at atmospheric pressure so that the several parts of the emergency portion 4 will remain in their emergency positions. The parts of the service portion 3 will also remain in their application position with the brake pipe completely vented since at this time the service piston is subject to the pressure of fluid in valve chamber 14, which pressure will be approximately sixty (60) pounds due to the equalization of the pressures in the brake cylinder, auxiliary reservoir and emergency reservoir. Thus at the termination of an emergency application of the brakes the service piston 10 will be held in emergency position by auxiliary reservoir pressure while the emergency piston will be subject on opposite sides to fluid at substantially atmospheric pressure and will therefore remain in its emergency application position.

In order to release an emergency application of the brakes, fluid under pressure will be supplied to the brake pipe 12 and thence to piston chambers 11 and 32 for increasing the pressure of fluid acting on the service and emergency pistons 10 and 31, respectively. Upon a slight increase in the pressure of fluid in chamber 32 the emergency piston 31 will move out of its emergency position and back to its normal position which is defined by its contact with a plunger 51 which is subject to the pressure of a spring 52. The piston 32 as it is thus moved will shift the main slide valve 35 back to its normal position in which passage 21a from the emergency reservoir 6 is lapped, thereby closing communication between said reservoir and passage 26, which passage 26 at this time is still open to the brake cylinder device 7 and to the auxiliary reservoir 5 by way of a service portion 3.

Also in the normal position of the emergency piston 31, the port 37 is open to chamber 32, so that fluid will then flow from the brake pipe to valve chamber 33 and the quick action chamber 34 for charging the same. The rate of increase in brake pipe pressure for releasing the brakes exceeds the rate of charging of the valve chamber 33 by way of feed port 37 sufficiently to provide a faster increase in pressure in piston chamber 32 than occurs in valve chamber 33 so that by the time the brake pipe pressure acting in chamber 32 is increased to a relatively low degree, such as 10 pounds, a sufficient differential in pressure will be provided on piston 31 to overcome the pressure of spring 52 on plunger 51 and move the piston 31 past its release position to a back-dump position defined by contact between said piston and a stop 53 in the casing.

In this back-dump position of the main slide valve 35, the cavity 48 opens communication between passage 26 and a passage 54 and fluid under pressure from the brake cylinder device 7 and connected auxiliary reservoir 5 will flow to passage 54 and then past two serially arranged check valves 55 to a passage 56 which is open to passage 46 leading to the brake pipe 12. Since the emergency brake applying pressure in the brake cylinder and auxiliary reservoir may be around sixty pounds, as hereinbefore mentioned and the pressure of fluid in the brake pipe 12 may be at a relatively low degree, such as 10 pounds, at the time the emergency valve moves to back-dump position, the fluid from the brake cylinder device 7 and connected auxiliary reservoir supplied to the brake pipe will therefore cause a local increase in pressure therein to about 45 pounds, thus hastening the recharge of the brake pipe 12 and thereby the release of brakes following an emergency application. Upon substantial equalization of the pressure of fluid in the brake cylinder device 7 and auxiliary reservoir 5 into the brake pipe 12, the upper check valve 55 will seat under the action of a spring 57 to prevent back flow of fluid from the brake pipe upon a further normal increase in brake pipe pressure back to its normal value. During this further increase in brake pipe pressure the valve chamber 33 and quick action chamber 34 will become charged to the same pressure as in the brake pipe by way of feed port 37. Upon substantial equalization of these pressures spring 52 acting on plunger 51 will return the emergency piston 31 and the slide valves 35 and 36 to their normal positions.

When the brake pipe pressure effective in chamber 11 of the service portion 3 is increased to a degree slightly exceeding the reduced auxiliary reservoir pressure in valve chamber 14, said piston will operate to return the slide valves 17 and 18 to their normal release position in which they are shown, in which position communication is closed between the brake cylinder device 7 and the auxiliary reservoir 5 and said reservoir is recharged with fluid under pressure from the brake pipe, and the brake cylinder device is open to atmosphere for releasing the brakes. Also in this position of the slide valve 17, the emergency reservoir 6 is again open to valve chamber 14 and is therefore recharged with fluid at the pressure in the brake pipe.

Briefly summarizing the operations above described for a clear understanding of the operations of the reservoir releasing valve device 8 which follows, it will be noted that upon an emergency reduction in brake pipe pressure from a normal degree such as 70 pounds both the auxiliary reservoir 5 and emergency reservoir 6 are open to the brake cylinder device 7 and the pressures of fluid in said reservoirs equalizes into said brake cylinder device at substantially 60 pounds. Upon a subsequent increase in brake pipe pressure to effect a release of the brake application, the several parts of the emergency portion 4 move to back-dump position upon a relatively small increase in brake pipe pressure to disconnect the emergency reservoir from the brake cylinder device 7, thereby holding in the emergency reservoir fluid at substantially 60 pounds pressure. In this back-dump position the pressure of fluid in the brake cylinder device 7, auxiliary reservoir 5 and brake pipe 12 equalize at substantially 45 pounds which result in a reduction in pressure in said reservoir and brake cylinder device to about 45 pounds. When the brake pipe pressure is then increased above this pressure (45 pounds) effective in the auxiliary reservoir, the piston 10 and slide valves 17 and 18 are returned to their normal position. With the slide valves in this position, communication is closed between the auxiliary reservoir and the brake cylinder device, and said reservoir is charged with fluid under pressure from the brake pipe, and the brake cylinder device is opened to the atmosphere for releasing the brakes. Also, with the parts of the service portion 3 returned to their normal position, communication is open between the auxiliary reservoir and the emergency reservoir to allow charging of the latter to the brake pipe pressure.

A more complete description of the "AB" brake controlling valve device is not deemed essential to a clear understanding of the invention but if further information as to the functioning of this device is desired, reference may be had to Clyde C. Farmer, Patent No. 2,031,213, issued February 18, 1936.

*Description—Brake releasing valve device 8*

The brake releasing valve device 8 comprises a casing 60 which is preferably mounted on the pipe bracket 2 and is provided with passages which form extensions of the passages 13, 15, 21b, 23 and 28, in the pipe bracket and are connected respectively to the piston chambers 11 and 33, auxiliary reservoir 5, emergency reservoir 6, brake cylinder device 7 and the atmosphere. The casing 60 is provided with a slide valve chamber 70 which is in constant open communication with the brake pipe 12 by way of a passage and branch pipe 71. Contained in this chamber is a slide valve 72 which is mounted between two spaced shoulders on a stem 73 which is connected to one side of a flexible diaphragm 74 clamped around its periphery in the casing. A chamber 75 at the other side of the diaphragm 74 is in constant open communication with a passage 76 which leads to the seat for the slide valve 72. Contained in this chamber 75 is a push rod 77 which is rigidly attached to the diaphragm 74 and extends to the exterior through a suitable bore in the casing in which it is slidably mounted.

The push rod 77 is provided for manual operation to deflect the diaphragm 74 and to move the slide valve 72 from its normal position, in which it is shown in the drawing, in the direction of the right-hand until stopped in another position by a diaphragm follower 78 engaging a shoulder 79 of the casing 60. For deflecting the diaphragm 74 and to thereby effect movement of the slide valve 72 into this other position, the outer end of the push rod 77 may be connected by any conventional means (not shown) to opposite sides of a car for operation by a trainman.

A rockable strut 80 having one end in contact with the casing within a recess 81 extends through a suitable slot in the diaphragm stem and into a recess in the slide valve 72 wherein it has rocking engagement with said slide valve. This strut is provided with a collar 82 between which collar and the casing is interposed a spring 83 which acts through the medium of the strut to hold the slide valve seated at all times.

When the brake pipe 12 is charged with fluid under pre-pressure, such pressure is effective in valve chamber 70 at the right-hand face of diaphragm 74 to maintain the diaphragm 74 and slide valve 72 in their normal position in which they are shown in the drawing unless manually moved by the push rod 77 as will be later described.

In this normal position of slide valve 72, passage 13 is open to valve chamber 70 thus connecting brake pipe 12 to piston chambers 11 and 32 in the pipe bracket of the "AB" brake controlling valve device so that said valve may operate in response to variations in pressure in the brake pipe to apply and release the brakes in the usual manner as above described without any interference from the releasing valve device 8.

*Operation*

If a car provided with the brake releasing valve device 8 is cut out of a train and the brake pipe 12 is vented to atmosphere in the usual manner, the "AB" brake controlling valve device will operate to cause an emergency application of the brakes in the same manner as above described, it being noted that the piston chambers 11 and 32 will both be open to the vented brake pipe 12 by way of passage 13, past the slide valve 72 and then through valve chamber 70 and passage and pipe 71.

With the brakes on the car thus applied and the brake pipe 12 and thereby piston chambers 11 and 33 open to atmosphere, let it be assumed that it is desired to release the fluid under pressure from the brake cylinder device 7 for releasing the brakes, without recharging the brake pipe 12 and without permitting a material loss in fluid pressure stored in the auxiliary and emergency reservoirs.

To accomplish this a trainman from a position at the side of the car will push the plunger 77 inwardly and thereby deflect the diaphragm 74 from its normal position in which it is shown, in a direction toward the right-hand. Deflection of the diaphragm in this direction causes the attached stem 73 and slide valve 72 to move in the same direction until brought to a stop by the engagement of the follower 78 with the stop shoulder 79 on the casing 60. With the slide valve in this position, communication between passage 13 and chamber 70 and thereby the brake pipe 12 is closed and passage 13 is connected through a cavity 84 in the slide valve 72 to an extension of passage 21b, which is connected to the emergency reservoir 6. Emergency reservoir 6 is also connected by way of passage 21b, cavity 84 and passage 76 to chamber 75 at the left-hand side of diaphragm 74.

With the communication between passages 13 and 21b thus established, fluid under pressure flows from the emergency reservoir 6 and thereby from the connected brake cylinder and auxiliary reservoir to the service and emergency piston chambers 11 and 32 when, due to this flow, a slight increase in pressure is attained in chamber 32 at one side of the emergency piston 31, the opposite side of which is at this time subject to atmospheric pressure, said piston will move to the position in which it is shown in the drawing in which position the emergency reservoir 6 is disconnected from the auxiliary reservoir 5 and the brake cylinder device 7. In this position, the feed port 37 is open to the piston chamber 32 to permit flow of fluid from said chamber to valve chamber 33 and the connected quick action chamber 34. The supply communication leading from the auxiliary reservoir and brake cylinder to the piston chamber 32 has a flow capacity exceeding that of the feed port 37, so as to thereby provide a more rapid increase in pressure in piston chamber 32 than is obtained in valve chamber 33. As a result, a differential in pressure will be created on the emergency piston 31 and when this differential is increased to about 10 pounds, this piston will act to position the slide valve 35 in the back-dump position above described, movement of the piston being opposed by the spring weighted plunger 51. Fluid under pressure will then flow from the auxiliary reservoir 6 and brake cylinder device 7 through cavity 48 in the slide valve 35 and thence past check valves 55 to passage 56 and into the connected piston chambers 11 and 32, thereby providing a relatively rapid increase in pressure in said chamber to about 55 pounds, and thus equalizing the pressure of fluid in the auxiliary reservoir, brake cylinder and chambers 11 and 32. This increase in pressure in piston chambers 11 and 32 is greater than in the usual back-dump operation of the "AB" brake controlling valve device due to the brake pipe 12 on the car being disconnected at this time from said chambers by the slide valve 72 of the releasing valve device 8.

After this back-dump operation, fluid under pressure continues to flow from the emergency piston chamber 32 through feed groove 37 to valve chamber 33 and quick action chamber 34 for charging the same. When the opposing pressures acting on the emergency piston 31 becomes substantially equal, the pressure of spring 52 acting on plunger 51 will return the piston 31 and associated slide valves to the position in which they are shown in the drawing, cutting emergency reservoir off from the brake cylinder device and auxiliary reservoir. It will be noted that during this time the service piston 10 remains in its application position in sealing engagement with the gasket 29 since the auxiliary reservoir pressure effective in valve chamber 14 is at least equal to the opposing pressure (55 pounds) now in chamber 11.

However, since the auxiliary reservoir is connected to the brake cylinder device, which is connected to atmosphere by way of pipe 22, passage 23, a cavity 85 in slide valve 72 and a passage 86, the pressure of fluid in the auxiliary reservoir and consequently in valve chamber 14 will reduce until the excess of fluid pressure in piston chamber 11 acting upon the service piston 10 will cause the piston to move the slide valves 17 and 18 to the position in which they are shown. In this position of the slide valves, the auxiliary reservoir is disconnected from the brake cylinder device 7 and as a result fluid under pressure in the brake cylinder device only will continue to flow to atmosphere. A choke 87 may be provided in the passage 86 to prevent an unduly rapid rate of reduction in the pressure of fluid in the auxiliary reservoir and thus prevent an unnecessary loss of fluid from the auxiliary reservoir before the slide valve 17 is operated to cut off the auxiliary reservoir from the brake cylinder.

The emergency reservoir being connected to chamber 75 by way of passage 21b, cavity 84 and passage 76, fluid pressure acting on diaphragm 74 will maintain the slide valve 72 in its right-hand position as long as the brake pipe 12 and chamber 70 are devoid of fluid under pressure.

When the car is subsequently cut into a train and the brake pipe 12 is again charged with fluid under pressure, the fluid pressure in valve chamber 70 of the release valve device 8 will increase with that in the brake pipe 12, and when this pressure acting on diaphragm 74 has been increased to a degree slightly exceeding the pressure of fluid in emergency reservoir 6 acting on the opposite side of the diaphragm 74, the diaphragm 74 and thereby the slide valve 72 will be returned to their normal positions. When the slide valve is in its normal position as shown in the drawing, the passage 21b and thereby the emergency reservoir 6 is disconnected from the passage 76 and, passage 76 is connected to the atmosphere through cavity 85 in the slide valve 72 and the atmospheric passage 86. The slide valve 72 upon movement to its normal position uncovers passage 13 in chamber 70 thus reconnecting the piston chambers 11 and 32 to the brake pipe 12 so that the "AB" brake controlling valve device will again operate in response to variations in pressure in the usual manner above described.

The parts of the brake releasing valve device 8 will now remain in the positions in which they are shown even though the pressure of fluid in the brake pipe 12 is reduced to atmospheric pressure as is the case in effecting an emergency application of the brakes, movement of diaphragm 74 and slide valve 72 out of their normal position to their right-hand position, defined by contact of the follower 78 with the cylinder 79, must be effected manually by means of rod 77.

With the car cut into the train and the piston chambers 11 and 32 again connected to the brake pipe 12 past slide valve 72, the fluid under pressure required from the brake pipe 12 for recharging the brake equipment is limited to that needed to increase the pressure of fluid in the auxiliary and emergency reservoirs from the degree retained therein by the brake releasing valve device 8 to the normal degree carried in the brake pipe, thus requiring less fluid pressure and less time for recharging this system than is ordinarily required where the two reservoirs are completely vented for obtaining a release of the brakes.

*Summary*

From the foregoing description it will be apparent that when a car is set out of a train the brake pipe will be at atmospheric pressure and the fluid pressure brakes will be applied, and that to release the brakes without loss of the stored fluid pressure in the auxiliary and emergency reservoirs of the equipment all that is required is for the trainman to manually operate the brake release valve device to its brake cylinder venting position. It will also be apparent that when the car is again cut into a train and the charging of the brake pipe occurs, the equipment will be automatically reset to provide for the usual well known operation of the "AB" equipment to control the application and release of the brakes.

Having now described my invention, what I claim as new and desire to secure by Letters Patent is:

1. In a fluid pressure brake equipment of the type comprising a brake pipe normally charged with fluid under pressure, an auxiliary reservoir and an emergency reservoir both normally charged with fluid under pressure, a brake cylinder, and a brake controlling valve device responsive to a reduction in brake pipe pressure to supply fluid under pressure from both of said reservoirs to said brake cylinder to effect an application of the brakes and responsive to an increase in brake pipe pressure to isolate said reservoirs from the brake cylinder, in combination, brake releasing valve means movable to a position to connect said brake cylinder to atmosphere, to isolate the brake pipe from the brake controlling valve device and to supply fluid under pressure from said emergency reservoir to the brake controlling valve device to effect the operation of said brake controlling valve device to isolate both reservoirs from said brake cylinder, and means for moving said brake releasing valve means to said position.

2. In a fluid pressure brake equipment of the type comprising a brake pipe normally charged with fluid under pressure, an auxiliary reservoir and an emergency reservoir both normally charged with fluid under pressure, a brake cylinder, and a brake controlling valve device responsive to a reduction in brake pipe pressure to supply fluid under pressure from both of said reservoirs to said brake cylinder to effect an application of the brakes and responsive to an increase in brake pipe pressure to isolate said reservoirs from the brake cylinder, in combination, brake releasing valve means having a normal position for establishing communication between the brake pipe and the brake controlling valve device and movable to a position to connect said brake cylinder to atmosphere, to isolate the brake pipe from the brake controlling valve device and to supply fluid under pressure from said emergency reservoir to the brake controlling valve device to effect the operation of said device to isolate both reservoirs from said brake cylinder, means for actuating said brake releasing valve means to said position, and fluid pressure responsive means operative by fluid under pressure supplied from said emergency reservoir to maintain said valve means in said position, said fluid pressure responsive means being operative by fluid from the brake pipe when the pressure of such fluid exceeds the pressure of fluid in the emergency reservoir to return said valve means to said normal position.

3. In a fluid pressure brake equipment of the type comprising a brake pipe normally charged with fluid under pressure, an auxiliary reservoir and an emergency reservoir both normally charged with fluid under pressure a brake cylinder, and a brake controlling valve device responsive to a reduction in brake pipe pressure to supply fluid under pressure from both of said reservoirs to said brake cylinder to effect an application of the brakes and responsive to an increase in brake pipe pressure to isolate said reservoirs from the brake cylinder, in combination, brake releasing valve means including a slide valve movable to a position to connect said brake cylinder to atmosphere, to isolate the brake pipe from the brake controlling valve device and to supply fluid under pressure from said emergency reservoir to the brake controlling valve device to effect the operation thereof to isolate both reservoirs from said brake cylinder, means for actuating said slide valve to said position, and movable abutment means connected to said slide valve and subject to the opposing pressures of fluid in said brake pipe and a control chamber, passage means associated with said slide valve and arranged to admit fluid under pressure, in said position, from said emergency reservoir to said control chamber to cause said movable abutment to act to maintain said slide valve in said position, said abutment means being responsive to a subsequent increase in the pressure of fluid in the brake pipe in excess of the opposing pressure in the control chamber for returning said slide valve from said position.

4. In a fluid pressure brake equipment of the type comprising a brake pipe normally charged with fluid under pressure, an auxiliary reservoir and an emergency reservoir both normally charged with fluid under pressure, a brake cylinder, and a brake controlling valve device responsive to a reduction in brake pipe pressure to supply fluid under pressure from both of said reservoirs to said brake cylinder to effect an application of the brakes and responsive to an increase in brake pipe pressure to isolate said reservoirs from the brake cylinder, in combination, brake releasing valve means including a slide valve movable to a position to connect said brake cylinder to atmosphere, to isolate the brake pipe from the brake controlling valve device and to supply fluid under pressure from said emergency reservoir to the brake controlling valve device to effect the operation thereof to isolate both reservoirs from said brake cylinder, means for actuating said slide valve to said position, and movable abutment means connected to said slide valve and subject to the opposing pressures of fluid in said brake pipe and a control chamber, said slide valve being effective in said position to connect said emergency reservoir to said control chamber.

5. In a fluid pressure brake equipment of the type comprising a brake pipe normally charged with fluid under pressure, an auxiliary reservoir and an emergency reservoir both normally charged with fluid under pressure, a brake cylinder, and a brake controlling valve device responsive to a reduction in brake pipe pressure to supply fluid under pressure from both of said reservoirs to said brake cylinder to effect an application of the brakes and responsive to an increase in brake pipe pressure to isolate said reservoirs from the brake cylinder, in combination, brake releasing valve means including a slide valve movable to a position to connect said brake cylinder to atmosphere, to isolate the brake pipe from the brake controlling valve device and to supply fluid under pressure from said emergency reservoir to the brake controlling valve device to effect the operation thereof to isolate both reservoirs from said brake cylinder, means for actuating said slide valve to said position, and movable abutment means connected to said slide valve and subject to the opposing pressures of fluid in said brake pipe and a control chamber, passage means connecting said control chamber to the seat of said slide valve, said slide valve being effective in said position to connect said emergency reservoir to said passage means.

6. In a fluid pressure brake equipment of the type comprising a brake pipe normally charged with fluid under pressure, an auxiliary reservoir and an emergency reservoir both normally charged with fluid under pressure, a brake cylinder, and a brake controlling valve device responsive to an emergency reduction in brake pipe pressure to supply fluid under pressure from both of said reservoirs to the brake cylinder to effect an application of the brakes and operative upon a subsequent increase in brake pipe pressure to first supply fluid under pressure from said reservoirs and brake cylinders to the brake pipe and to then isolate said reservoirs from the brake cylinder and to vent fluid under pressure from the brake cylinder to effect a release of the brakes, in combination, a communication through which the variations in brake pipe pressure control the normal operations of the brake controlling valve device to effect the application and release of the brakes auxiliary brake releasing valve means interposed in said communication, and being operative to disestablish said communication between the brake pipe and the brake controlling valve device, to connect the brake cylinder to the atmosphere and to supply fluid under pressure to effect the brake releasing operation of said brake controlling valve device, and means for effecting the operation of said auxiliary brake releasing means.

7. In a fluid pressure brake equipment of the type comprising a brake pipe normally charged with fluid under pressure, an auxiliary reservoir and an emergency reservoir both normally charged with fluid under pressure, a brake cylinder, and a brake controlling valve device responsive to an emergency reduction in brake pipe pressure to supply fluid under pressure from both of said reservoirs to the brake cylinder to effect an application of the brakes and operative upon a subsequent increase in brake pipe pressure to supply fluid under pressure from said reservoirs and brake cylinder to the brake pipe, to then isolate the emergency reservoir from the auxiliary reservoir and brake cylinder, and to finally disconnect the auxiliary reservoir from the brake cylinder and to vent fluid under pressure from the brake cylinder to effect the release of the brakes, in combination, an auxiliary brake releasing valve means normally establishing communication through which the variations in brake pipe pressure control the normal operation of said brake controlling valve device to effect the application and release of the brakes, and being operative to disestablish the communication between the brake pipe and the brake controlling valve device, to connect the brake cylinder and thereby the auxiliary reservoir to the atmosphere and to supply fluid under pressure from the emergency reservoir to effect the brake releasing operations of the brake controlling valve device, and means for actuating said auxiliary brake releasing valve means.

8. In a fluid pressure brake equipment of the type comprising a brake pipe normally charged with fluid under pressure, an auxiliary reservoir and an emergency reservoir both normally charged with fluid under pressure, a brake cylinder and a brake controlling valve device responsive to an emergency reduction in brake pipe pressure to supply fluid under pressure from both of said reservoirs to the brake cylinder to effect an application of the brakes and operative upon a subsequent increase in brake pipe pressure to first supply fluid under pressure from said reservoirs and brake cylinder to the brake pipe, to then isolate the emergency reservoir from the auxiliary reservoir and brake cylinder and to finally disconnect the auxiliary reservoir from the brake cylinder and to vent fluid under pressure from the brake cylinder to effect the release of the brakes, in combination, an auxiliary brake releasing valve means normally positioned establishing a communication through which the variations in brake pipe pressure control the normal operations of said brake controlling valve device to effect the application and release of the brakes, and being operative to another position to disestablish the communication between the brake pipe and the brake controlling valve device, to connect the brake cylinder and thereby the auxiliary reservoir to the atmosphere and to supply fluid under pressure from the emergency reservoir to effect the brake releasing operations of the brake controlling valve device, means for actuating said auxiliary brake releasing valve means from its normal position to said other position, means conditionable for maintaining said auxiliary brake releasing valve means in said other position, means included in said valve means for supplying fluid under pressure to one side of said means when said valve means is in said other position to condition the means to maintain the auxiliary brake releasing valve means in said other position.

9. In a fluid pressure brake equipment of the type comprising a brake pipe normally charged with fluid under pressure, an auxiliary reservoir and an emergency reservoir both normally charged with fluid under pressure, a brake cylinder and a brake controlling valve device responsive to an emergency reduction in brake pipe pressure to supply fluid under pressure from both of said reservoirs to the brake cylinder to effect an application of the brakes and operative upon a subsequent increase in brake pipe pressure to first supply fluid under pressure from said reservoirs and brake cylinder to the brake pipe, to then isolate the emergency reservoir from the auxiliary reservoir and brake cylinder and to finally disconnect the auxiliary reservoir from the brake cylinder and to vent fluid under pressure from the brake cylinder to effect the release of the brakes, in combination, an auxiliary brake releasing valve means normally positioned establishing a communication through which the variations in brake pipe pressure control the normal operations of said brake controlling valve device to effect the application and release of the brakes, and being operative to another position to disestablish the communication between the brake pipe and the brake controlling valve device, to connect the brake cylinder and thereby the auxiliary reservoir to the atmosphere and to supply fluid under pressure from the emergency reservoir to effect the brake releasing operations of the brake controlling valve device, means for actuating said auxiliary brake releasing valve means from its normal position to said other position, means conditionable for maintaining said auxiliary brake releasing valve means in said other position, means included in said valve means for supplying fluid under pressure to one side of said means when said valve means is in said other position to condition the means to maintain the auxiliary brake releasing valve means in said other position, said means being responsive to the pressure of fluid from the brake pipe and acting on the other side of said means when, in recharging the brake pipe, the brake pipe pressure exceeds the opposing pressure of fluid acting on said one side of said means to return said valve means to its normal position.

RALPH T. WHITNEY.